Fig. 1.

INVENTOR.
Edward H. Sahagian
BY Louis C. Smith
Attorney

United States Patent Office 2,976,054
Patented Mar. 21, 1961

2,976,054

STABILIZING MEANS FOR THE AIR SPRINGS OF AN AUTOMOBILE

Edward H. Sahagian, 46 Brent St., Dorchester 24, Mass.

Filed Dec. 17, 1958, Ser. No. 781,118

10 Claims. (Cl. 280—124)

This invention relates to stabilizing means for the air springs of an automobile and especially for air springs of the hydro-pneumatic type in which each air spring includes both a sealed expansible and contractible chamber containing air—or any other suitable gas, such as nitrogen—under pressure and a liquid-receiving chamber containing a suitable liquid such as oil, said chambers being so associated that the liquid in the liquid-receiving chamber is continually subjected to the same pressure as that of the air or gas in the air chamber.

For convenience, the gas which fills the expansible and contractible chamber of each hydro-pneumatic spring will be referred to as "air," and the springs themselves will be referred to as "air springs"; but as stated above, any suitable gas may be used and the invention is not limited to the use of any particular gas.

One object of the invention is to provide novel means whereby when either side of the automobile body is subjected to abnormal downward pressure which tends to depress such side below its normal level position, as would be the case when the automobile is making a sharp turn at high speed, means will automatically be rendered operative to deliver added liquid to the liquid-receiving chambers of the air springs on said downwardly moving side, thereby building up therein sufficient added pressure to maintain said side of the automobile body in its normal level position.

Another object of the invention is to provide means whereby when either side of the automobile body is subjected to forces tending to elevate said side above its normal level, means will automatically be rendered operative to discharge sufficient liquid from the liquid-receiving chamber of each of the two air springs on the upwardly moving side of the automobile body to reduce the pressure therein to a point at which the springs will support the automobile body in a level position.

Another object of the invention is to provide novel means whereby when either end of the automobile body is carrying an extra load which tends to depress said end below its normal level, or when said end of the automobile body is subjected to other abnormal downward pressure tending to depress it below its normal level, said means will become operative automatically to supply added liquid to the liquid-receiving chambers of the air springs at said end of the automobile body, thereby increasing the air pressure in said springs sufficiently so that they maintain the said end of the automobile body in its normal level position.

Another object of the invention is to provide means which will operate automatically when said end of the automobile body is relieved of the abnormal downward pressure to withdraw from the liquid-receiving chambers of the springs at said end the added liquid which was delivered to said chambers thus restoring said springs to a condition in which they support said end of the automobile body in its normal level position.

Associated with each air spring is a control means which controls the delivery of liquid from a source of supply to the liquid-receiving chamber of the spring and also controls the discharge of liquid from said chamber of the air spring as described above.

The two control means for the front and rear air springs on each side of the automobile are interconnected in such a way that each control means is operative only when it acts in unison with the other control means.

In the construction shown in the drawings, each control means comprises two separate control units, one of which is electrically operated and the other of which is mechanically operated.

Figure 3:
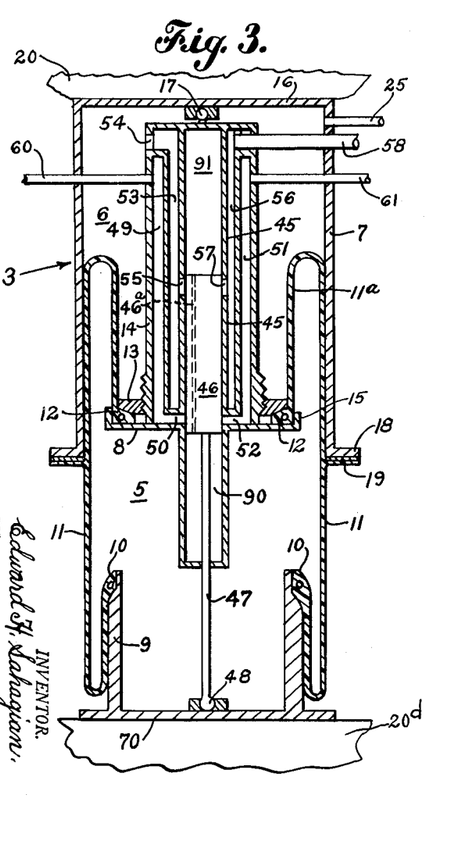
Fig. 3 is a vertical sectional view of a front air spring embodying the invention.
Figure 4:
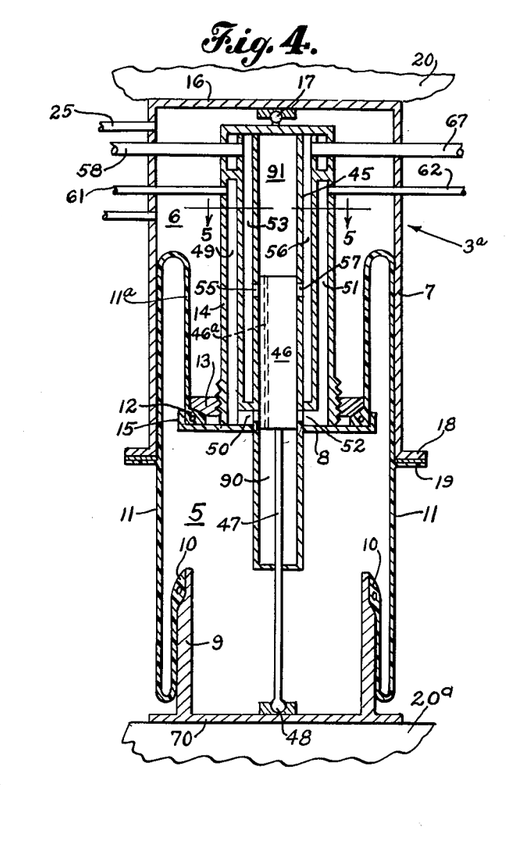
Fig. 4 is a similar view of a rear air spring.
Figure 5:
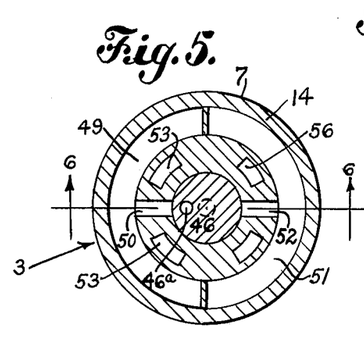
Fig. 5 is a section on the line 5—5, Fig. 6.
Figure 6:
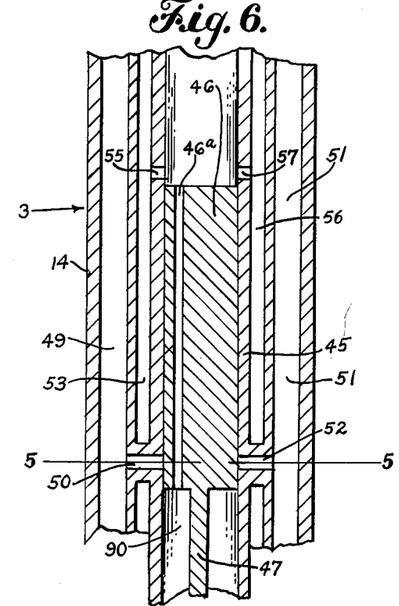
Fig. 6 is a section on the line 6—6, Fig. 5, showing the control valve in normal position.
Figure 7:
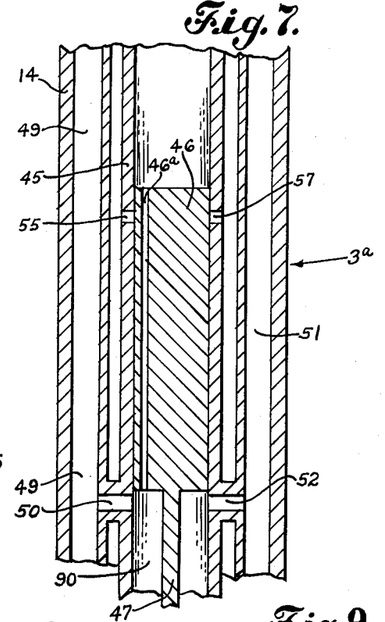
Fig. 7 is a view similar to Fig. 6 but showing the control valve in raised position.

The construction of the air spring is illustrated in Figs. 3 and 4—Fig. 3 showing the front air spring on one side of the automobile and Fig. 4 showing the rear air spring.

The front air springs are indicated at 3, and the rear air springs are indicated at 3a. Each air spring has a sealed air chamber 5 and a separate liquid-containing chamber 6 which is contained within an exterior casing 7.

The air chamber 5 is formed with a flexible side wall 11 which is secured at one end to a bottom member 70 and at the other end to a top plate 8. The bottom member 70, which is of metal, is shown as having an upstanding circular wall 9 to the top of which the lower edge 10 of the wall 11 of the air chamber 5 is secured.

The upper end of the circular wall 11 of said air chamber is formed with a bead 12 which is clamped to the top plate 8 by means of a clamping nut 13 that is screw-threaded to the lower end of an inner casing 14 that is rigid with the plate 8 and rises above the latter. Said plate 8 is shown as having a peripheral flange 15 which surrounds the bead 12 and holds it in place as it is clamped to the plate 8. The inner casing 14 is secured to the top 16 of the outer casing 7, as shown at 17. The lower end of the casing 7 has an outward projecting flange 18 which rests on and is secured to a peripheral flange 19 with which the circular wall 11 is provided.

The upper portion 11a of the circular wall 11 of the air chamber 5 which is above the flange 18 is enclosed within the outer casing 7, while the lower portion of said wall below said flange is free to expand and contract laterally. The upper portion 11a of the flexilbe wall 11 of the air chamber 5 also forms part of the wall of the liquid-receiving chamber 6 so that the same pressure will exist in both chambers of each air spring.

Figure 10:
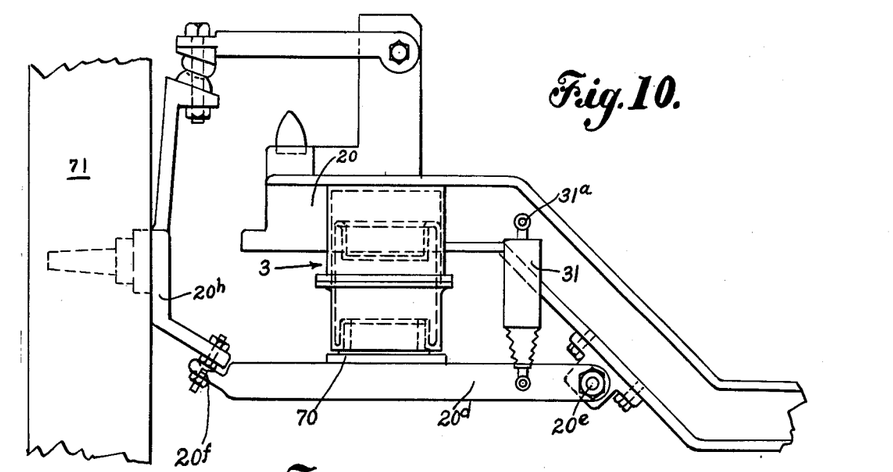
Fig. 10 shows the manner of supporting the front air spring.

Each air spring may be mounted on an automobile in any suitable or usual way with a portion 20 of the frame of the automobile body resting on the top 16 of the outer casing 7 and with the bottom member 70 of the air chamber attached to and supported by the usual spring support. Such spring support for the rear air spring is shown at 20a in Fig. 11, one end of said support being mounted at 20b on the rear axle housing and the other end being pivotally connected to the frame 20 of the automobile body, as shown at 20c. In the case of the front air spring, the spring support 20d is pivotally connected at one end to the frame 20 of the automobile body, as shown at 20e, Fig. 10, while its other end is pivotally connected at 20f to a wheel-supporting element 20h on which one of the front wheels 71 of the automobile is mounted.

The means for maintaining the liquid-receiving chamber 6 of each air spring filled with liquid includes a tank 21 which contains liquid under a pressure higher than that normally used in the air chambers. This tank 21 is supplied with liquid by means of a pump 22 which is connected to a receiving tank 23 into which is delivered the liquid which is discharged from the liquid-receiving chambers of the various air springs, as will be presently described. The pressure or supply tank 21 has a delivery pipe 24 leading therefrom and through which liquid under pressure is delivered to the liquid-receiving chamber of each air spring, as will presently be described.

A check valve 80 is located between the pump 22 and the pressure tank 21. The pipe 24 has an electrically controlled valve 26 therein which is automatically closed when the ignition circuit of the automobile is open and is automatically opened when the ignition circuit is closed. This ignition circuit is shown dagrammatically at 27, and it includes the usual key-controlled ignition switch shown at 28 which is open when the key is removed from the car but is closed when the key is in place and is turned into operating position.

As stated above, the delivery of liquid under pressure from the pressure tank 21 to the liquid-receiving chamber 6 of the various air springs is controlled by a plurality of control means, one of which is associated with each air spring; and the control means for the two air springs on each side of the antomobile body are so interconnected that in order to be effective, both said control means must operate in unison.

As shown in the drawings, each control means comprises two units, one of which is electrically operated and the other of which is mechanically operated.

The electrically operated control units will first be described.

Figure 1:
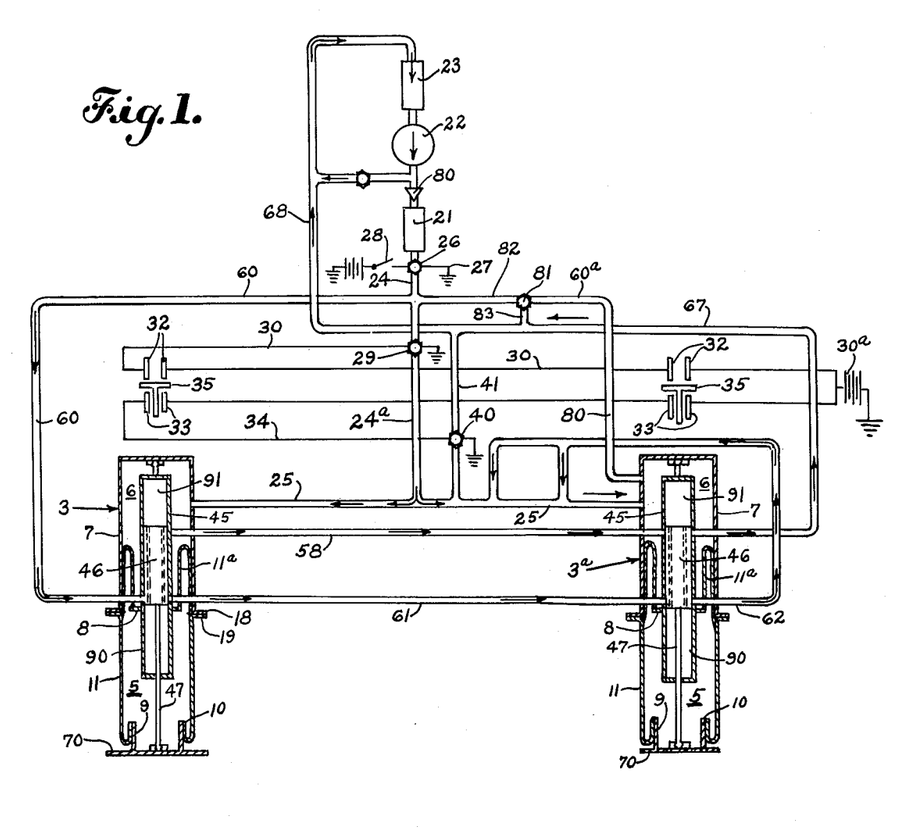
Fig. 1 is a more or less schematic view illustrating the front and rear air springs on one side of the automobile body and the system of piping associated therewith.

As shown in Fig. 1, the delivery pipe 24 is connected by a pipe section 24a to two branches 25, one of which leads to the liquid-receiving chamber 6 of the front air spring 3 and the other of which leads to the liquid-receiving chamber 6 of the rear air spring 3a.

Figure 8:
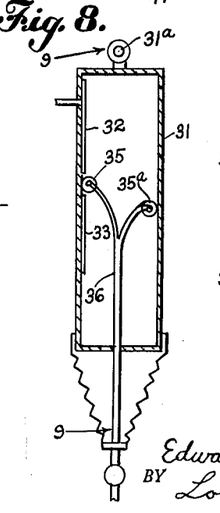
Fig. 8 is a vertical sectional view of the electrical control unit taken on the line 8—8, Fig. 9.
Figure 9:
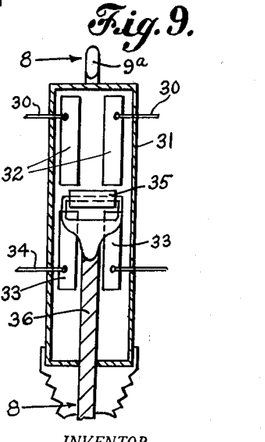
Fig. 9 is a section taken on the line 9—9, Fig. 8.

The pipe 24a also has a normally closed, electrically controlled valve 29 therein which is in an electrical control circuit 30, said circuit being connected to a battery 30a or other source of electricity. Said circuit is normally open when the automobile body is in its usual level position. This circuit 30 is closed by the cooperation of the electrical control units which are associated with the two air springs on the same side of the automobile. Such electrical control is illustrated in Figs. 8 and 9, and it comprises a casing 31 which is secured in some suitable way to the portion 20 of the automobile body as shown at 31a. The walls of the casing 31 are made of insulating material, and mounted on the inner face of said walls are two pairs of contacts—the contacts of one pair being shown at 32 and those of the other pair at 33. The upper pair of contacts 32 of each control unit are in the circuit 30, and the lower contacts 33 are in a companion circuit 34, also connected with the source of electricity 30a.

Situated within the casing 31 is a movable contact 35 which normally is located between and out of engagement with the two pairs of contacts 32 and 33, as shown in Figs. 8 and 9. The contact 35 is shown in the form of a roll mounted on but insulated from the forked end of a member 36 which extends through the bottom of the casing 31 and is connected to the spring-supporting member 20a or 20d, depending on whether the control unit is associated with the rear air spring or the front air spring. The member 36 also carries a roll 35a which engages the opposite side of the casing 31 from that carrying the contacts 32 and 33 and which serves to maintain the bridging contact 35 in firm engagement with the contacts 32 or 33. With this construction, when either side of the automobile is subjected to forces tending to depress it below its normal position, the casings 31 of the two control units on said side will move downwardly relative to the spring support and the contact 35 of each unit will bridge the two upper contacts 32 thereof. The circuit 30 will then be closed at both of the control units; and when this occurs, the circuit 30 will be energized, thereby opening the valve 29 in the pipe 24a so that the liquid-receiving chambers 6 of both the front and rear air springs on the depressed side of the automobile will be in open communication with the pressure tank 21 and liquid under pressure will thus flow into the liquid-receiving chambers of both air springs on said side of the automobile, thereby building up an increased pressure in the air chambers 5 of said air springs which is sufficient to counteract the depressing force on the springs and to bring such side of the automobile to its normal level position. When this condition prevails, then the casing 31 of each of the electrical control units will be raised so that the contact 35 of each control unit will move off from the contacts 32, thereby opening the circuit 30. When this occurs, the valve 29 will automatically close; and so long as the force tending to depress the side of the automobile continues, the automobile body will be retained in its proper level condition.

When the force tending to depress the side of the automobile ceases, then the increased pressure which has been built up in the air springs on said side of the automobile body will provide a force tending to raise said side above its normal level position; and as the said side of the automobile body rises, the contacts 33 in each of the electrical control units on said side will be brought into contact with the bridging contact 35, thereby closing the circuit 34 which includes a normally closed, electrically operated valve 40 that is located in a pipe 41 that is connected at one end to one of the branch pipes 25 and at the other end to a return pipe 68 that leads to the receiving tank 23.

The closing of the circuit 34 causes the valve 40 to open, thus allowing liquid under pressure in the liquid-receiving chambers 6 of the two air springs 3 and 3a on the same side of the automobile body to flow through the pipes 25, 41, and 68 into the receiving tank 23, thereby reducing the pressure in the said air springs and allowing the side of the automobile body which is supported thereby to settle to its normal level position. When this condition exists, the contact 35 of each control unit will assume the position shown in Figs. 8 and 9 and the circuit 34 will be opened, and the valve 40 will be closed automatically.

The most common cause for developing a downward pressure on one side of the automobile body which tends to lower it below its normal level is the centrifugal force developed when an automobile is traveling at a high speed over a curved portion of the highway. This action produces a downward pressure on the side of the automobile at the outside of the curve and an upward pressure on the autombile's body on the inside of the curve.

With the construction above described, as one side of the automobile body begins to be depressed and the other side begins to rise when the automobile starts to round the curve, the control devices for the front and rear air springs on the downwardly moving side of the automobile body come into play as above described, thereby opening the valve 29 and allowing added liquid under pressure to be delivered to the liquid-receiving chambers of said air springs, which results in building of added pressure therein and maintaining the said side of the automobile body in its proper level position.

If the side of the automobile body on the inside of the curve starts to rise, the control units on said side will close the circuit 34, thereby opening valve 40 as above described so that liquid in the liquid-receiving chambers 6 of the air springs on the upwardly moving side of the automobile body will flow therefrom through the pipes 41 and 68 to the tank 23.

When the fast traveling automobile passes out of the curve in the highway onto a straight stretch, then—as stated above—the added fluid which has been delivered to the front and rear air springs tends to elevate said side of the automobile body above its normal level position and this will cause a sufficient upward movement of the casings 31 of the electrical control units on said side to move upwardly to a point where the contact 35 will bridge the contacts 33, thus closing the circuit 34 and opening the valve 40 to allow the surplus fluid which has been delivered to the fluid-receiving chamber 6 of the two air springs to be discharged therefrom and to be delivered to the receiving tank 23.

Furthermore, if when the automobile leaves the curve and enters said straight stretch of the highway, the side of the automobile body which was on the inside of the curve sinks to a position below its normal level because some of the liquid in the liquid-receiving chambers of the air springs on said side has been discharged, said control units on said side will function as above described to open the valve 29 to permit sufficient liquid from the tank 21 to flow into said liquid-receiving chambers to raise said side to its normal level.

In the construction shown in the drawings, each air spring includes not only the electrical control unit above described but also a mechanically operated control unit which, however, functions in the same way as the electrical control unit above referred to.

The mechanical control unit involves a control valve which is shown as built into each air spring. The control valves of the two air springs on each side of the automobile body are connected in such a way that when the automobile body is in its normal level position, both control valves are closed; but when either side of the automobile body is depressed below its normal level, the control valves on said side operate jointly to open a passage from the pressure tank 21 to the liquid-receiving chambers of the two air springs on said side so that liquid under pressure is added to such chambers, thereby building up the air pressure in both of said air springs to counteract the downward pressure on said side of the automobile body and thus bring said side to its normal level position. As soon as this condition exists, the control valves will be closed automatically, thereby maintaining said side of the automobile body in its normal position.

When such downward pressure terminates and said side tends to rise above its normal level position, then these two control valves again operate jointly to open a passage from the liquid-receiving chambers to the receiving tank 23, thus allowing liquid to flow from said chambers into said tank, thereby reducing the pressure in the two air springs sufficiently to hold said side of the automobile body at its normal level position. When this condition again exists, the control valves will be automatically closed, thereby maintaining such normal position.

For this purpose, the inner casing 14 of each air spring is provided with a cylinder 45 in which operates a piston valve 46 that has connected thereto a piston rod 47 that in turn is connected to the bottom member 70 of the air chamber, as shown at 48. The inner casing 14 is also provided with a passageway 49 leading to an inlet port 50 that communicates with the lower chamber 90 of the cylinder 45. Said casing also has a discharge passageway 51 which communicates at its lower end with a discharge port 52 which also communicates with the lower cylinder chamber 90. In addition, the inner casing 14 of each air spring has a third passage 53 which communicates with an upper inlet port 55 leading to the upper cylinder chamber 91. Said inner casing 14 also has an additional passage 56 which communicates with a discharge port 57 located opposite the inlet port 55. When the automobile body is in its normal level position, the piston valve 46 of each air spring will be in the position shown in Figs. 3 and 4, in which position it closes both the lower inlet and discharge ports 50 and 52 and also the upper inlet and discharge ports 55 and 57.

The piston valve 46 has a passage 46a extending therethrough from one end to the other so as to maintain the same pressure in both the upper and lower chambers of each cylinder. With this construction, when the piston valve in each air spring is raised, the inlet passage 49 in each air spring will be in direct communication with the passage 51 through the lower inlet and outlet ports 50 and 52 and the lower cylinder member 90, while the upper inlet and outlet ports of each air spring will remain closed.

When the piston valve 46 of each air spring is moved downwardly in its cylinder, the upper inlet and discharge ports will be open, thus establishing a communication between the passages 53 and 56 of the air spring through the upper cylinder chamber. The passage 51 of the front air spring is connected to the passage 49 of the rear air spring by a pipe 61 and the passage 56 of the front air spring is connected to the passage 53 of the rear air spring by a pipe 58.

In the front air spring 3, the inlet passage 49 is in communication with a pipe 60 (see Fig. 3) which is connected to the pipe 24a (see Fig. 2) and thus to the pressure tank 21 through the pipe 24, and as stated above, the passage 51 of said front air spring is connected by a pipe 61 to the passage 49 of the rear air spring 3a (see Fig. 4). The passage 51 of said rear air spring is connected by a pipe 62 to one of the branch pipes 25 and thus to the pipe 24a, which, as stated above, is in communication with the pressure tank 21. When the automobile body is at its normal height, the piston valves 46 are in the position shown in Figs. 3 and 4, thereby closing the communication between the pressure tank 21 and the liquid-receiving chambers 6 of the air springs.

Figure 2:
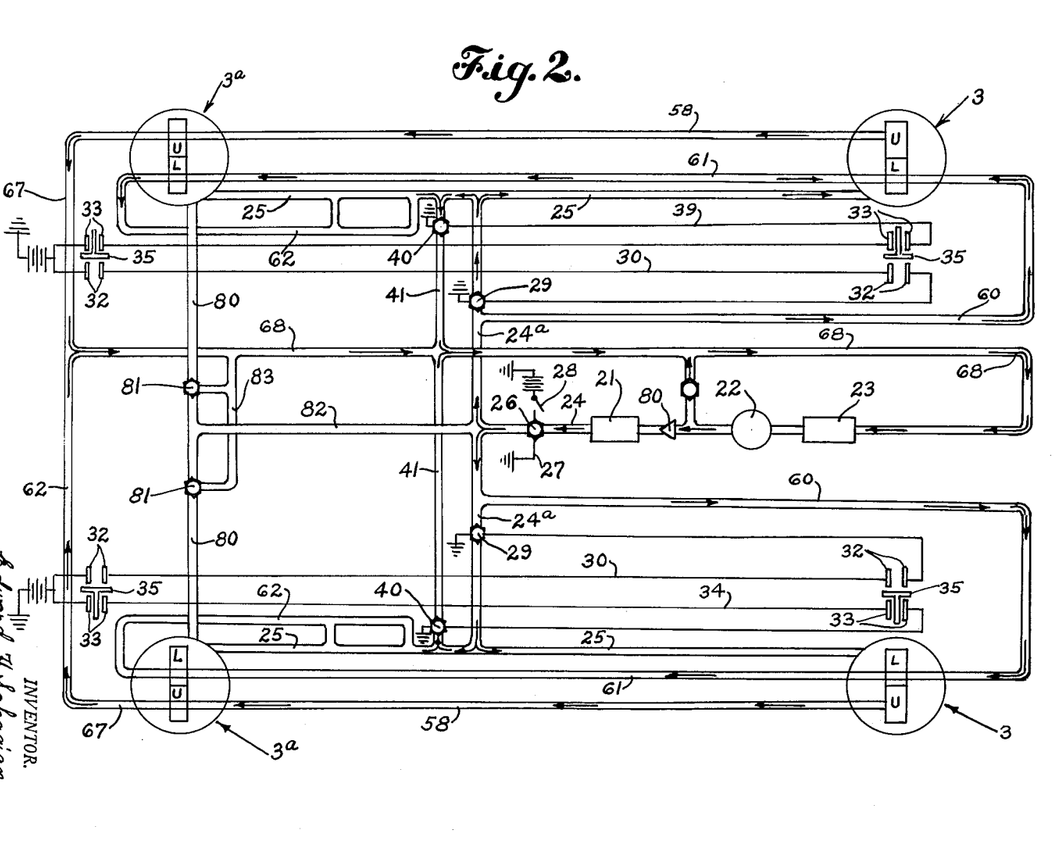
Fig. 2 is a similar view but showing the air springs on both sides of the automobile body.

The connection between the front and rear air springs is shown diagrammatically in Figs. 1 and 2. In Fig. 1 the pipe 60 is shown as leading directly to the lower inlet port 50 of the front air spring 3 and the pipe 61 is shown as communicating directly with the discharge port 52 of the front air spring and the lower inlet port 50 of the rear air spring 3a, while the pipe 62 is shown as connecting directly with the lower discharge port 52 of the rear air spring 3a.

In Fig. 2, the upper cylinder chamber of each air spring is indicated at U and the lower cylinder chamber at L.

When one side of the automobile is subjected to downward pressure sufficient to move the exterior casings 7 of the front and rear air springs downwardly a distance sufficient to open the lower inlet and outlet ports 50 and 52 in each air spring 3 and 3a on said side, there will be an open passage from the pressure tank 21 through the pipe 60, through the front control valve, the pipe 61, and the rear control valve to the pipe 62. This pipe 62 leads into one of the branch pipes 25 so that when this condition exists, liquid under pressure may flow from the tank 21 through both control valves in succession and through pipes 62 and 25 into the liquid-containing chamber 6 of each of the two air springs on said side. This will build up pressure in both air springs sufficiently to counteract the downward pressure on the side of the automobile and restore said side to its normal level. This will result in closing the valves in both air springs; and so long as the extra downward pressure on the said side of the automobile body continues, said side will remain at such normal level.

When the abnormal downward pressure on said side of the automobile ceases, the increased pressure which has been developed in the air springs on the said side will tend to move said side upwardly beyond its normal level position. This upward movement will operate the control valves on said side to open a communication between the liquid-receiving chambers 6 of each of the air springs 3 and 3a on said side and the receiving tank 23 so that the added liquid which was delivered to said liquid-receiving chambers may flow into said tank.

For this purpose, the passage 53 of the front air spring is open at 54 to the liquid-receiving chamber 6 thereof and as stated above the passage 56 of said front air spring is connected by a pipe 58 to the passage 53 of the rear air spring 3a. The passage 56 of the rear air spring communicates with a pipe 67 that connects with a pipe 68 that leads to the receiving tank 23.

When said side of the automobile body rises above its normal level position as described above, the upward movement of the casings 7 in relation to the piston valves 46 will open the upper inlet port 55 and the upper outlet port 57 of each control valve on said side so that the liquid under the higher pressure in the chamber 6 of the front air spring may flow from said chamber through the front control valve, the pipe 58, the rear control valve, and the pipes 67 and 68 to the receiving tank 23.

The liquid under the higher pressure in the chamber 6 of the rear air spring will flow from said chamber through the pipe 25 to the chamber 6 of the front air spring and from said chamber and thus to the tank 23 as above described. The surplus liquid which was delivered to the fluid-receiving chambers of the air springs 3 and 3a is thus discharged therefrom through both of the control valves and thence back to the receiving tank 23.

When sufficient fluid has thus been discharged from the fluid-receiving chambers to bring the automobile body into its level position, the piston valves 46 of the two air springs 3 and 3a will be brought back to their normal position shown in Figs. 3 and 4, thus preventing any further discharge of fluid from the fluid-receiving chambers.

In the foregoing description it has been explained how the device illustrated operates to deliver added liquid to the liquid-receiving chambers of both the front and rear air springs on either side of the automobile body whenever said side is depressed below its normal level, thereby building up an added pressure in both said front and rear air springs in order to level up the automobile body. It also has been described how when either side of the automobile body is raised above its normal level, the device above described functions to discharge some of the liquid from the liquid-containing chambers of the air springs on said side, thereby to reduce the pressure in such air springs and allow the body of the automobile to assume its proper level position.

The device illustrated also functions to deliver added liquid to both of the rear air springs, thereby to increase the pressure therein whenever the rear end of the automobile body is depressed below its normal level—as would be the case if said rear end were heavily loaded.

The device also will operate to discharge liquid from the liquid-containing chambers of each of the rear air springs whenever the rear end of the automobile body tends to rise above its normal level, thereby to restore said end to its normal position.

One way of accomplishing this is illustrated in Fig. 2, wherein the liquid-containing chamber of each of the rear air springs 3a has a pipe 80 communicating therewith, which pipes 80 connect with a pipe 82 leading to the pipe 24 which is connected to the pressure tank 21. Each of the pipes 80 has therein a normally closed time delay leveling valve 81 of any suitable construction so that under normal conditions, the pipes 80 will be shut off from the pipe 82.

When, however, the rear end of the automobile body is depressed below its normal level, the two time delay leveling valves 81 will be automatically opened to allow a small flow of liquid under pressure from the pipe 24 through the pipes 82 and 80 into the liquid-receiving chambers 6 of the two rear air springs. The rate of flow is such that an appreciable period of time, such as two or three minutes, may elapse before sufficient liquid has been delivered to said chamber 6 to raise said heavily loaded rear end to its normal level. When such level has been reached, the levelling valves 81 are closed automatically, thereby maintaining said rear end at its proper level.

When the abnormal or excessive downward pressure on the rear end of the automobile has terminated—as would be the case when the heavy load on the rear end of the automobile body was removed—then the added pressure which has been bilt up in the two rear air springs would tend to raise the rear end of the automobile body above its normal level. The rising movement of the rear end operates the valves 81 to open a passage between the pipes 80 and a pipe 83 which communicates with the pipe 68 leading to the receiving tank 23. The surplus liquid which has previously been delivered to the liquid-receiving chambers of the two rear air springs is then allowed to flow back to the receiving tank 23, thereby allowing the rear end of the automobile body to settle. When said rear end has been lowered to its normal level, the valves 81 will be closed with the result that the rear end of the automobile body will be then maintained in its normal level position.

Time delay valves operating as above described are a well-known article of commerce, and hence it is deemed to be unnecessary to illustrate such a valve in detail.

Figure 11:
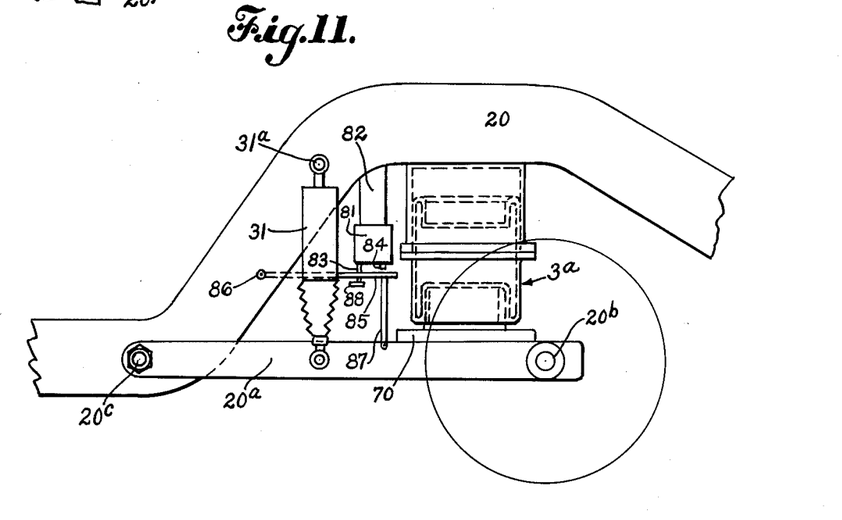
Fig. 11 shows one way of supporting the rear air spring.

Fig. 11, however, shows how such a valve may be mounted on the automobile body so as to perform its functions. In said figure, the valve 81 is mounted on a support 82 secured to the portion 20 of the automobile body. Said valve is shown as having two operating stems 83 and 84 which are actuated by a control member 85 which is pivoted at one end to the body member 20 as shown at 86. The other end of the member 85 is pivotally connected to the upper end of a link 87, the lower end of which is pivoted to the spring support 20a. The stem 83 is long enough to extend through the control member 85 and is provided with a head 88 beneath said member. The other stem 84 is shorter; and when the automobile body is at its normal level, the lower end of said stem 84 is spaced slightly above said control member.

When the rear end of the automobile body is depressed below its normal level position, the stem 84 is brought into contact with the control member and said stem will be moved upwardly. Such upward movement operates the valve 81 to open a communication between the corresponding pipe 80 and the pipe 82 so that liquid may flow from the pressure tank 21 into the liquid-receiving chambers 6 of both rear air springs.

When the rear end of the autombile rises above its normal level position, the upward movement of the portion 20 of the automobile body will bring the head 88 of the stem 83 against the control member 85 so that said stem will be pulled downwardly. Such downward movement operates the valve 81 to open a communication between the pipes 80 and 83, thus allowing liquid to flow from the chambers 6 of the rear air springs into the receiving tank 23.

Owing to the deliberate operation of the time control valves 81, they will not function as a result of a rapid up-and-down movement of the rear end of the automobile occasioned by driving at normal speed over bumps in the road surface but are only effective when the rear end is maintained for an appreciable period of time in a position either below or above its normal level position.

As stated above, each air spring has associated with it a control unit which controls the delivery of liquid under pressure to the liquid-receiving chamber of said air spring and also controls the discharge of liquid from said liquid-receiving chamber.

It will be noted that these control units are arranged in pairs, the control units of each pair being so connected that neither control unit will be operative to admit liquid under pressure to the liquid-receiving chamber of the corresponding air spring or the discharge of liquid therefrom except when it is operated in unison with the other control unit of the pair.

In the illustrated embodiment of the invention, both of the control units of any pair are associated with the air springs on the same side of the automobile body and hence when the control units of any pair are actuated, either liquid under pressure will be delivered to the liquid-receiving chambers of both the front and the rear air springs on the same side of the automobile body, or will be operative to open communication between the liquid-receiving chambers of the air springs on the same side of the automobile body and the receiving tank.

However, it is within my invention to arrange the pairs of control units so that one control unit of the pair is associated with the air spring on one side of the automobile body and the other control unit of said pair is associated with the air spring on the other side of the automobile body.

The construction shown in the drawings also has the advantage that it reduces considerably the pitch motion of an automobile body occasioned by the automobile passing over bumps in the road surface.

When the front wheels of an automobile pass over such a bump, the front air springs are subjected to a momentarily increased pressure which tends to force the front end of the automobile body upwardly, and such upward movement results in depressing the rear end of the automobile body. When said front wheels have passed completely over the bump, the front end of the automobile body has a downward movement which results in an upward movement of the rear end of said automobile body. These momentary upward and downward movements of the ends of the automobile body are commonly referred to as "pitching" motions.

With the construction shown in the drawings in which the liquid-receiving chamber 6 of each front air spring 3 has communication with the liquid-receiving chamber 6 of the corresponding rear air spring 3a through the pipe system 25, the upward movement of the front wheels of the automobile in passing over a bump in the road will produce momentarily an increased pressure in the front air spring which causes liquid from the liquid-receiving chamber 6 of the front air spring to flow through the pipes 25 into the liquid-receiving chamber 6 of the rear air spring.

This flow of liquid from the liquid-receiving chamber 6 of the front air spring tends to decrease the upward pressure on the front end of the automobile body, and the addition of liquid to the liquid-receiving chamber 6 of the rear air spring tends to increase the upward pressure on the rear end of the automobile body. The result will be that as the front wheels of the automobile pass up onto the bump, the total upward pressure tending to raise the front end of the automobile body is decreased and the pressure in the rear air springs which resists downward movement of the rear end of the automobile body is increased. The upward movement of the front end of the automobile body occasioned by the front wheels moving over the bump is thereby reduced, and the same is true of the downward movement of the rear end of the automobile body.

When the front wheels have passed completely over the bump, the pressures in the front and rear air springs will become equalized by a reverse flow of the liquid from the rear air spring to the front air spring.

The same operation occurs in reverse when the rear wheels of an automobile pass over a bump in the road surface. With applicant's device wherein the increased pressure in the front air springs resulting from the front wheels passing onto a bump is reduced by the flow of liquid from the liquid-receiving chamber 6 of the front air springs to the liquid-receiving chamber 6 of the rear air springs results in a diminution of the pitching motion of the automobile body.

I claim:

1. Stabilizing means for the air springs of an automobile in which the automobile is supported on each side by a front air spring and a rear air spring each of which has a sealed air chamber provided with a flexible wall and an expansible and contractible liquid-receiving chamber, said stabilizing means comprising a source of liquid under pressure, a system of pipes providing a communication between said source of liquid under pressure and the liquid-receiving chamber of each of the two air springs on the same side of the automobile body, valve means normally closing said communication, control means associated with each air spring, the two control means on the same side of the automobile body having a tandem connection and being rendered operative only by the simultaneous downward movement of both the front and rear ends of said side below their normal level position to open said communication whereby liquid under pressure will flow from said source into the liquid-receiving chambers of both of the air springs on said downwardly moving side of the automobile body, thereby to increase the pressure in the air chamber of each of said air springs sufficiently to restore both ends of said side to their normal level positions.

2. Stabilizing means for the air springs of an automobile in which the automobile is supported on each side by a front air spring and a rear air spring each of which has a sealed air chamber provided with a flexible wall and an expansible and contractible liquid-receiving chamber, said stabilizing means comprising a receiving tank, a system of pipes providing a communication between the liquid-receving chamber of each of the two air springs on the same side of the automobile body and said receiving tank, valve means normally closing said communication, control means associated with each air spring, the two control means on the same side of the automobile body having a tandem connection and being rendered operative only by the simultaneous upward movement of both the front and rear ends of said side of the automobile body to actuate said valve means and to open said communication whereby liquid from each of the liquid-receiving chambers of the air springs on said side of the automobile may flow from said chambers into the receiving tank, thereby overcoming the upward movement of said side of the automobile body and maintaining it at its normal level position.

3. Stabilizing means for the air springs of an automobile in which the automobile is supported on each side by a front air spring and a rear air spring each of which has a sealed air chamber provided with a flexible wall and an expansible and contractible liquid-receiving chamber, said stabilizing means comprising a source of liquid under pressure, a system of pipes providing a communication between said source of liquid under pressure and the liquid-receiving chamber of each of the two air springs on the same side of the automobile body, an electrically controlled shut-off valve normally closing said communication, an electrical control means associated with each of the two air springs on the same side of the automobile body, the two control means on each side of said body being connected in series in a normally open control circuit, means rendered operative only by the downward movement of both ends of the same side of the automobile body to energize the corresponding control circuit thereby opening the valve to permit liquid under pressure to flow from the source of compressed liquid to the liquid-receiving chamber of each of the air springs on said downwardly moving side of the automobile body, thereby to increase the pressure in the air chambers of said air springs sufficiently to restore said side of the automobile body to its normal level position.

4. Stabilizing means for the air springs of an automobile in which the automobile is supported on each side by a front air spring and a rear air spring each of which has a sealed air chamber provided with a flexible wall and an expansible and contractible liquid-receiving chamber, said stabilizing means comprising a receiving tank, a system of pipes providing a communication between the liquid-receiving chamber of each of the two air springs on the same side of the automobile body and said receiving tank, a normally closed electrically actuated control valve in said communication, an electric control unit associated with each air spring, the two electric control units on the same side of the automobile body being connected in series in a normally open control circuit and being rendered operative only by the simultaneous upward movement of both the front and rear ends of said side of the automobile body to close said circuit and thereby open the corresponding control valve, thus allowing liquid from the liquid-receiving chambers of the two air springs on said upwardly moving side of the automobile body to be discharged into the receiving tank.

5. Stabilizing means for the air springs of an automobile in which the automobile is supported on each side by a front air spring and a rear air spring each of which has a sealed air chamber provided with a flexible wall and an expansible and contractible liquid-receiving chamber, said stabilizing means comprising a source of liquid under pressure, a system of pipes providing a communication between said source of liquid under pressure and the liquid-receiving chamber of each of the two air springs on the same side of the automobile body, an electrically controlled shut-off valve normally closing said communication, an electric control unit associated with each air spring, each unit having a normally open switch, a control circuit in which the two switches on the same side of the automobile body are connected in series, means rendered operative only by the simultaneous downward movement of both ends of the automobile body on the same side thereof to close both of the two switches on the downwardly moving side of the automobile body thereby closing the corresponding control circuit and actuating the electric control valve for said side and establishing a communication between the source of liquid under pressure and the liquid-receiving chambers of the two air springs on said side whereby liquid under pressure will flow from said source into said liquid-receiving chambers and thus build up sufficient pressure in each of the two corresponding air springs to bring said side of the automobile body to and maintain it in its normal level position.

6. Stabilizing means for the air springs of an automobile in which the automobile is supported on each side by a front air spring and a rear air spring each of which has a sealed air chamber provided with a flexible wall and an expansible and contractible liquid-receiving chamber, said stabilizing means comprising a receiving tank, a system of pipes providing a communication between the liquid-receiving chamber of each of the two air springs on the same side of the automobile body and said receiving tank, a normally closed electrically actuated control valve in said communication, an electric control unit associated with each air spring, each unit having a normally open switch, a control circuit in which the two switches on the same side of the automobile body are connected in series, means rendered operative only by the simultaneous upward movement of both ends of the automobile body on the same side thereof to close both of said switches thereby actuating the electric control valve for said side and establishing a communication between the liquid-receiving chambers of the two air springs on said side and the receiving tank, whereby liquid will flow from said liquid-receiving chambers into said tank and said side of the automobile body will be restored to its normal level position.

7. In an automobile in which the automobile body is supported by two front air springs and two rear air springs, the combination with said air springs, each of which comprises a sealed air chamber and a liquid-receiving chamber which are separated by a flexible wall, of stabilizing means for said air springs comprising a source of liquid under pressure, a receiving tank, a system of pipes connecting the liquid-receiving chamber of each air spring to both the source of liquid under pressure and the receiving tank, a normally closed control valve associated with each air spring and located in said system of pipes and normally closing the communication between the liquid-receiving chamber of each air spring and both the source of liquid under pressure and the receiving tank, the control valves on each side of the automobile body being tandem connected by said pipes, means rendered operative by the downward movement of one side of the automobile body below its normal level position and the upward movement of the other side of said automobile body above its normal level position, to open the tandem connected control valves on the downwardly moving side of the automobile body and thus establish a communication from the source of liquid under pressure through both of said tandem connected control valves to the liquid-receiving chamber of each of the air springs on said downwardly moving side of the automobile body, and means also rendered operative by the upward movement of the other side of said automobile body to open both the tandem connected control valves on said other side and establish a communication through said last named control valves successively between the liquid-receiving chambers of said last-named air springs and the receiving tank.

8. In an automobile in which the automobile body is supported by two front air springs and two rear air springs, the combination with said air springs, each of which comprises a sealed air chamber and a liquid-receiving chamber which are separated by a flexible wall, of stabilizing means for said air springs comprising a source of liquid under pressure, a receiving tank, a system of pipes connecting the source of liquid under pressure to the liquid-receiving chambers of each of the air springs and also connecting said liquid-receiving chambers to the receiving tank, a first electrically controlled valve for the air springs on each side of the automobile body, which valve normally closes the communication between the source of liquid under pressure and the liquid-receiving chambers of the two springs on the corresponding side of said automobile body, a second electrically controlled valve on each side of the automobile body, each second electrically controlled valve normally closing the communication between the liquid-receiving chambers of the air springs on the corresponding side of the automobile body to the receiving tank, electrical means rendered operative only by the downward movement of one side of the automobile body to open the first electrically controlled valve on said side and thereby allow liquid to flow from the source of liquid under pressure to the liquid-receiving chambers of each of the two air springs on said downwardly moving side thereby to build up sufficient pressure in the air springs on said side to raise said side of the automobile body to its normal level, said means also being rendered operative only by the upward movement of the other side of the automobile body to open the second electrically controlled valve on said side thereby to allow liquid to flow from the liquid-receiving chambers of the two air springs on said upwardly moving side to the receiving tank thereby allowing said other side of the automobile body to return to its normal level position.

9. A stabilizing means for the air springs of automobiles as defined in claim 8 in which means are rendered operative to close the first electrically operated valve on the depressed side of the automobile body when said side has been restored to its normal level and also to close the second electrically operated valve on the other side of the automobile body when said other side has been restored to its normal level position.

10. Stabilizing means for the air springs of an automobile in which the automobile body is supported on two pairs of air springs, each of which air springs has a sealed air chamber provided with a flexible wall and an expansible and contractible liquid-receiving chamber, said stabilizing means comprising a source of liquid under pressure, a receiving tank, a system of pipes providing a communication between said source of liquid under pressure and the liquid-receiving chambers of the air springs of each pair, said system of pipes also providing a communication between the liquid-receiving chambers of each air spring and the receiving tank, valve means normally closing both communications, control means associated with each air spring, the two control means for the air springs of each pair having a tandem connection and being rendered operative only by the simultaneous downward movement of the two portions of the automobile body supported by the air springs of one pair to open the communication between the liquid-receiving chambers of the two air springs of said pair whereby liquid under pressure may flow from said source into the liquid-receiving chambers of both of said last-named air springs thereby to increase the pressure in the air chamber of each of said last-named air springs sufficiently to restore the portions of the automobile body supported thereby to their normal level positions, and means operated only by the simultaneous upward movement of both of the portions of the automobile body supported by the two air springs of the other pair to open communication between the liquid-receiving chambers of the air springs of said other pair and the receiving tank whereby liquid may flow from the liquid-receiving chambers of said other pair of air springs into the receiving tank.

References Cited in the file of this patent

UNITED STATES PATENTS

| | | |
|---|---|---|
| 2,139,178 | Stevens | Dec. 6, 1938 |
| 2,620,182 | Marston | Dec. 2, 1952 |
| 2,644,699 | Weiertz | July 7, 1953 |
| 2,707,110 | Stover | Apr. 26, 1955 |
| 2,720,274 | Blomquist | Oct. 11, 1955 |
| 2,828,139 | Lautzenhiser | Mar. 25, 1958 |

FOREIGN PATENTS

| | | |
|---|---|---|
| 211,064 | Australia | Oct. 25, 1957 |